United States Patent
Raillard et al.

(10) Patent No.: US 8,439,366 B2
(45) Date of Patent: May 14, 2013

(54) GASKET DESIGN FOR MOLDING LARGE GASKETS IN A DEFORMED SHAPE

(75) Inventors: Daniel Raillard, Chamboret (FR); Paul F. Hailey, Bedford, NH (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 122 days.

(21) Appl. No.: 13/220,994

(22) Filed: Aug. 30, 2011

(65) Prior Publication Data

US 2013/0049308 A1 Feb. 28, 2013

(51) Int. Cl.
*F02F 11/00* (2006.01)

(52) U.S. Cl.
USPC .......................................... 277/598; 277/924

(58) Field of Classification Search .................. 277/598, 277/616, 632, 637, 650, 924, 925
See application file for complete search history.

(56) References Cited

U.S. PATENT DOCUMENTS

| | | | |
|---|---|---|---|
| 3,438,117 A | 4/1969 | Engleman | |
| 3,485,908 A | 12/1969 | Burger | |
| 3,738,670 A | 6/1973 | Jelinek et al. | |
| 4,293,135 A | 10/1981 | Wallace | |
| 4,690,413 A | 9/1987 | Adkins | |
| 5,161,808 A | 11/1992 | Walters | |
| 5,618,047 A * | 4/1997 | Belter | 277/632 |
| 5,647,255 A | 7/1997 | Stone | |
| 5,934,681 A | 8/1999 | Novak et al. | |
| 6,536,775 B1 * | 3/2003 | Inciong | 277/596 |
| 2010/0253012 A1 * | 10/2010 | Zhuang et al. | 277/637 |

FOREIGN PATENT DOCUMENTS

JP 56024260 A * 3/1981

* cited by examiner

*Primary Examiner* — Vishal Patel
*Assistant Examiner* — Stacy Warren
(74) *Attorney, Agent, or Firm* — Daniel J. Sepanik, Esq.; Harness, Dickey & Pierce, P.L.C.

(57) ABSTRACT

A gasket includes a plurality of corner sections each having a cross-section having a width of at least a first dimension. A plurality of deformable sections are disposed between a pair of the plurality of corner sections, each of the plurality of deformable sections having a cross-section having a width less than the first dimension and having a curved shape that is deformable to a straight shape in its installed condition. The deformable sections allow the gasket to be formed with a smaller molding footprint than the assembled gasket shape and the plurality of corner sections have a same angled orientation in its installed and un-installed positions.

13 Claims, 4 Drawing Sheets

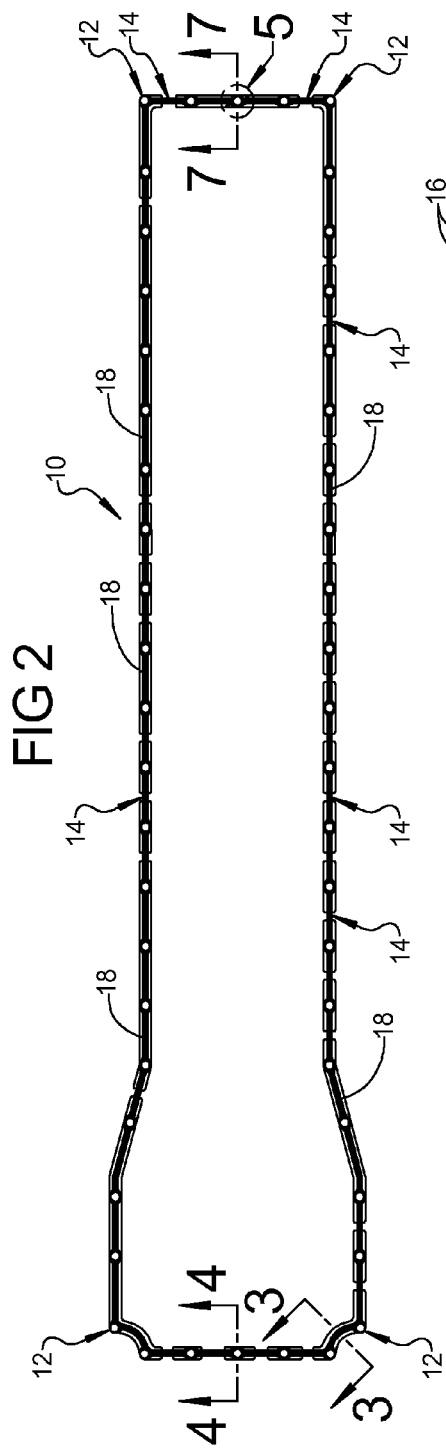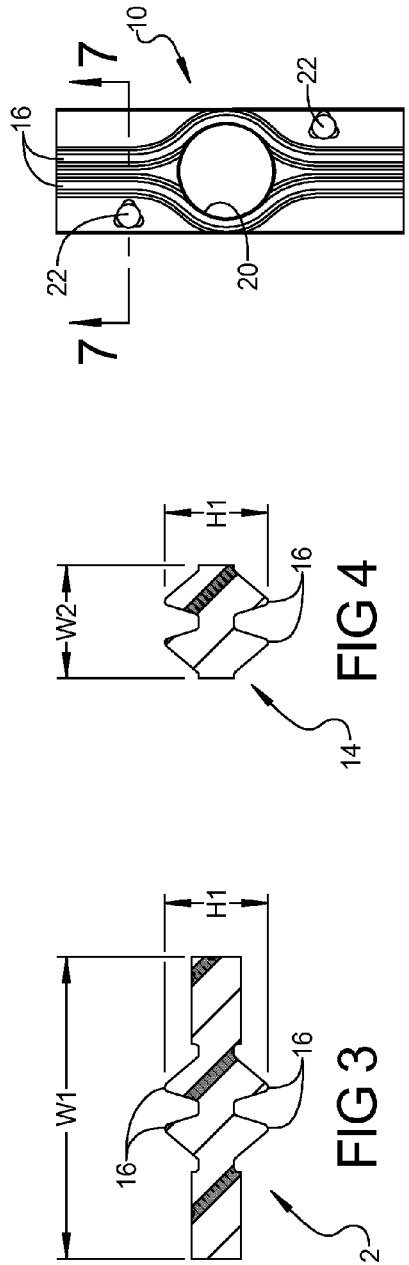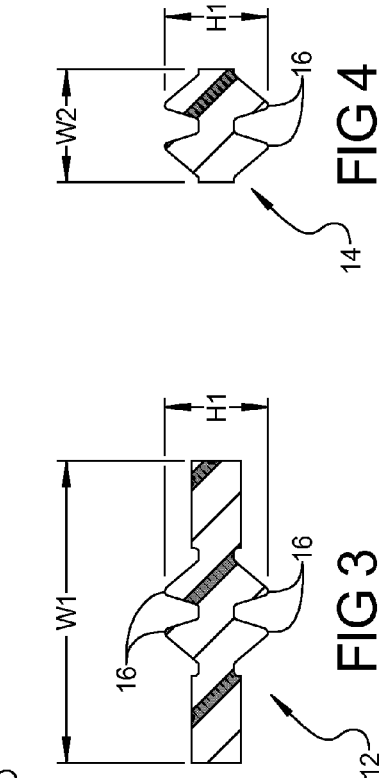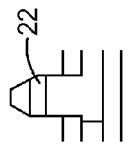

GASKET DESIGN FOR MOLDING LARGE GASKETS IN A DEFORMED SHAPE

FIELD

The present disclosure relates to a gasket design for molding large gaskets in a deformed shape.

BACKGROUND

This section provides background information related to the present disclosure which is not necessarily prior art.

Typically, gaskets used for sealing battery covers in electric or hybrid electric vehicles have been very large die cut foam-type gaskets. In order to get the required power from the electric batteries, these battery cases and covers are very large. In some cases much greater than one meter square and in some cases one meter by two meter. If the gasket were to be molded using a platen size equal to the gasket, the capital cost for the press would be very high and unfortunately the use of the press would be fairly limited to these battery gaskets. Accordingly, the present disclosure provides a gasket design that creates the opportunity to reduce the molding footprint of the part and can reduce the capital requirement to mold these large gaskets.

SUMMARY

This section provides a general summary of the disclosure, and is not a comprehensive disclosure of its full scope or all of its features.

The present disclosure provides a gasket comprising a plurality of corner sections each having a cross-section having a width of at least a first dimension. A plurality of deformable sections are disposed between a pair of the plurality of corner sections, each of the plurality of deformable sections having a cross-section having a width less than the first dimension and having a curved shape that is deformable to a straight shape in its installed condition. The deformable sections allow the gasket to be formed with a smaller molding footprint than the assembled gasket shape and the plurality of corner sections have a same angled orientation in its installed and un-installed positions.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is a top plan view of the large gasket formed according to the principles of the present disclosure in its assembled, straightened condition;

FIG. 3 is a cross-sectional view taken along line 3-3 of the large gasket shown in FIG. 2;

FIG. 4 is a cross-sectional view taken along line 4-4 of the large gasket shown in FIG. 2;

FIG. 5 is a close-up view of a segment of the gasket taken in section 5 of FIG. 2;

FIG. 6 is a cross-sectional view taken along line 6-6 of the large gasket shown in FIG. 2;

FIG. 7 is a cross-sectional view taken along line 7-7 of the gasket segment shown in FIG. 5;

Corresponding reference numerals indicate corresponding parts throughout the several views of the drawings.

DETAILED DESCRIPTION

Figure 1:
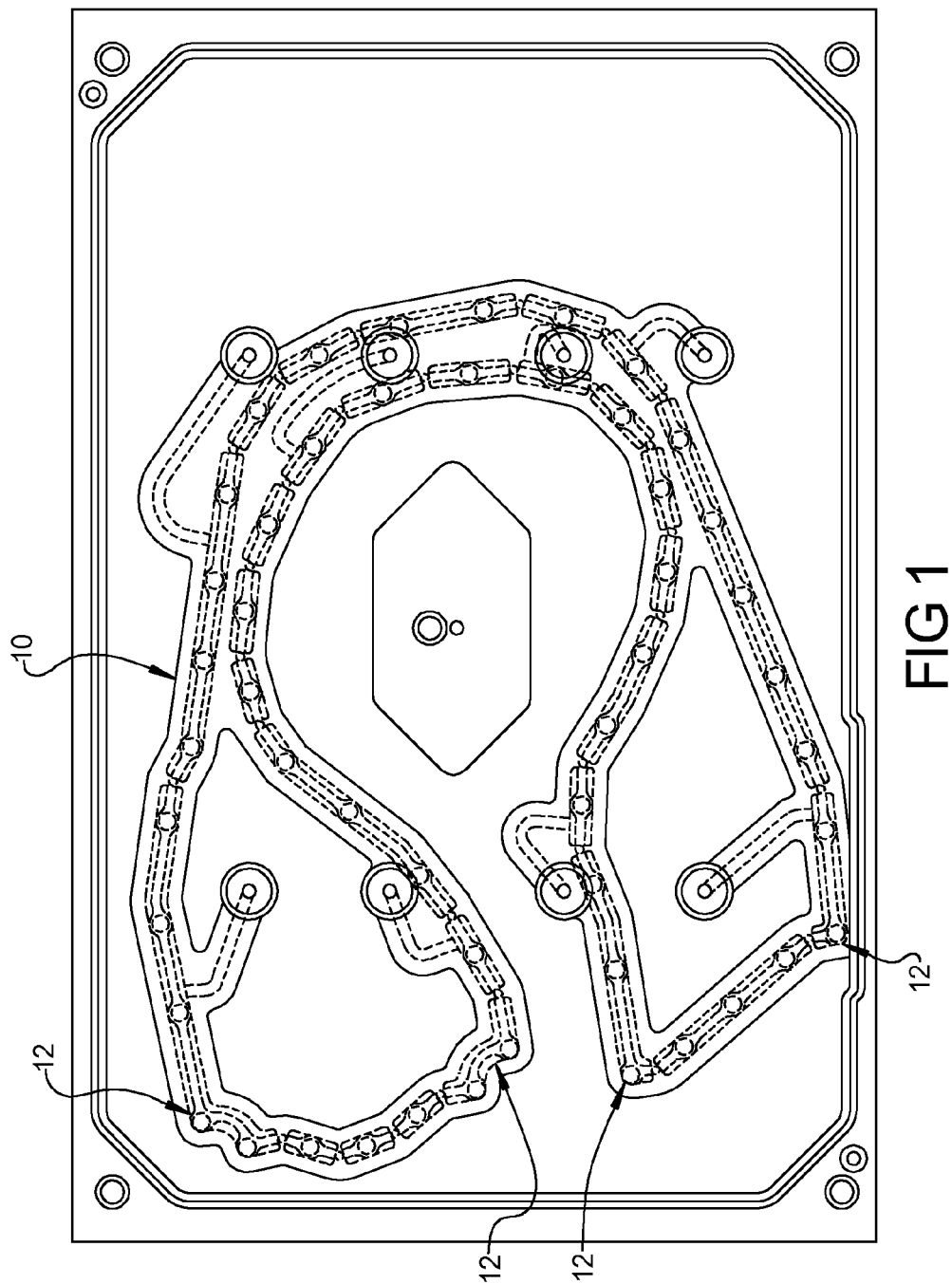
FIG. 1 is a top plan view of a mold cavity for forming a large gasket in a deformed shape as shown, according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-7, a gasket 10 is shown wherein the gasket is molded in a deformed shape as illustrated in FIG. 1 and is then straightened out into its assembled configuration as illustrated in FIG. 2 when assembled into a battery or other larger component requiring a gasket-type seal. FIG. 1 shows a mold die 4 having a mold cavity having the shape of the deformed gasket 10.

For ease of reference, the following description is with reference to the gasket 10 shown in FIG. 2 in its assembled straightened out condition. The gasket 10 includes a plurality of corner sections 12. It is noted that "corner sections" are intended to include directional transition regions that can include 90 degree or other angled transition regions or radiused transition regions. The corner sections each have a width W1 in cross-section that is significantly greater than a height H1 of the corner's cross-section as illustrated in FIG. 3. A plurality of deformable sections 14 are disposed between a pair of the plurality of corner sections 12. Each of the plurality of deformable sections 14 have a cross-section having a width W2 in cross-section which is significantly less than the width W1 of the corner sections. By way of non-limiting example, the width W1 of the corner sections 12 can have a width of at least 1.5 times to four times a width W2 of the deformable sections 14. More preferably, the width W1 can be two to three times the width W2 of the deformable sections. Furthermore, as illustrated in FIG. 1, the deformable sections 14 can have a curve shape in the original molded configuration that is deformable to a straight shape in its installed condition. Accordingly, the deformable sections 14 allow the gasket 10 to be formed with a smaller molding footprint as shown in FIG. 1 than the assembled gasket shape 10 as shown in FIG. 2.

The plurality of corner sections 12 have a same angled orientation in both the uninstalled and installed position so that the wider cross-section W2 of the corner section do not need to be deformed. The narrow width W2 of the deformable sections 14 allow the deformable sections 14 to be straightened out in the assembled condition without causing twisting of the gasket. The corner sections 12 and deformable sections 14 can be formed having a generally equal height dimension H1. The cross-section of the deformable sections 14 and the corner sections can each include at least one continuous raised bead portion 16 on top and bottom surfaces thereof, as illustrated in FIGS. 3 and 4. Furthermore, use of multiple raised beads 16 on the top and bottom surfaces can be utilized.

The deformable sections 14 can be flanked by straight sections 18 that generally have a width similar to the width W1 of the corner sections. The corner sections 12 and straight sections 18 can be provided with fastener holes 20 extending therethrough as illustrated in FIGS. 5 and 6. The lengths of the straight sections 18 and the number of deformable sections 14 can be varied depending upon a desired gasket shape.

The corner sections 12 and straight sections 18 can have a width dimension W1 which is at least twice the height dimension H1 of that section's cross-section. The deformable sections 14 are generally provided with a cross-section having a height H1 that is approximately equal to the width W2, although slightly smaller or larger width dimensions can be utilized. It is noted that the width W2 can be greater than the height H1 although the width W2 should be less than approximately 1.5 times the height H1 in order to provide flexibility without buckling during straightening out of the deformable section 14.

Figure 9:
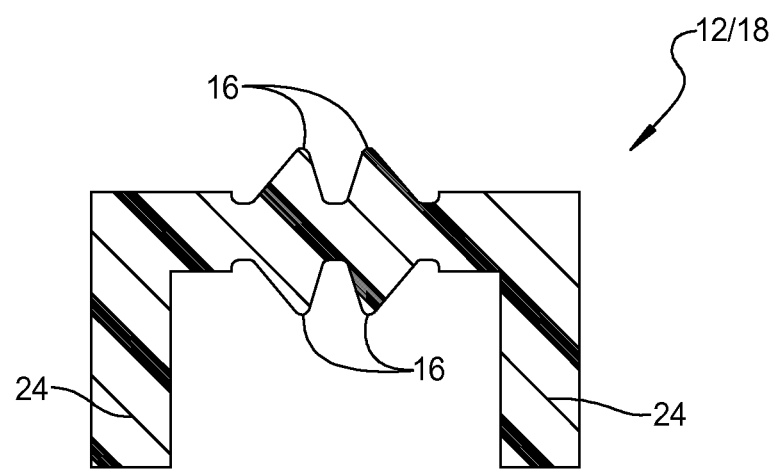
FIG. 9 is a cross-sectional view of an alternative configuration of the undeformed sections of the gasket according to the principles of the present disclosure.
Figure 10:
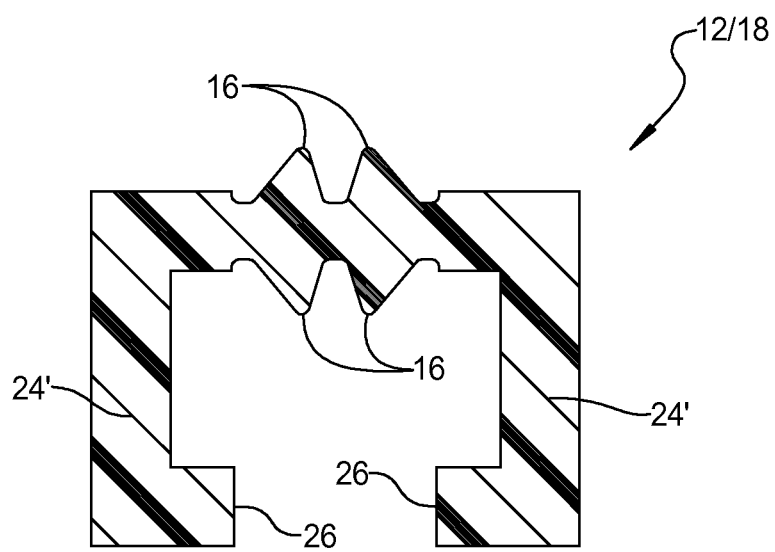
FIG. 10 is a cross-sectional view of a further alternative configuration of the undeformed sections of the gasket according to the principles of the present disclosure.

The gasket 10 can be formed with a plurality of indexing posts 22 as illustrated in FIGS. 5-7. The indexing posts 22 can be inserted in corresponding bores in the body being sealed in order to hold the gasket in place during the assembly process. The indexing posts 22 can be beveled or oversized so as to provide an interference fit when being inserted in bores in the mating component. The indexing posts can be located outside of the beads, as shown in FIGS. 5 and 6, or between a pair of sealing beads 16. The use of the posts 22 are optional and may not be necessary in all applications. As an optional alternative, as shown in FIGS. 9 and 10, the corner sections 12 and/or straight sections can have a U-shaped cross-section. The U-shape allows assembly of the gasket to a matched shape mating component wherein sidewalls 24 of the U-shaped cross-section straddle the edges of the mating component to help secure the gasket in place during assembly. As shown in FIG. 10, the sidewalls 24' can include undercut portions 26 for engaging corresponding recesses in the mating component and to further enhance the retaining function of the sidewalls 24'. The use of the U-shaped cross-section of FIG. 9 or 10 or the indexing posts 22 in the corner sections 12 and/or undeformed straight sections 18 does not affect the deformability of the deformable sections 14 but add significant stability to the gasket during the assembly process.

It is noted that the number of deformable sections 14 disposed between either corners 12 or straights 18 can be dictated by the amount that is necessary to reduce the footprint of the molded deformed gasket shape to an acceptable dimension. Along these lines, it is anticipated that at least one deformable section 14 would be needed in the lengthwise portions of an elongated gasket such as the one illustrated in FIG. 2. In the embodiment shown, deformable sections 14 are utilized in each of the straight sections of the four sides of the gasket.

Figure 8:
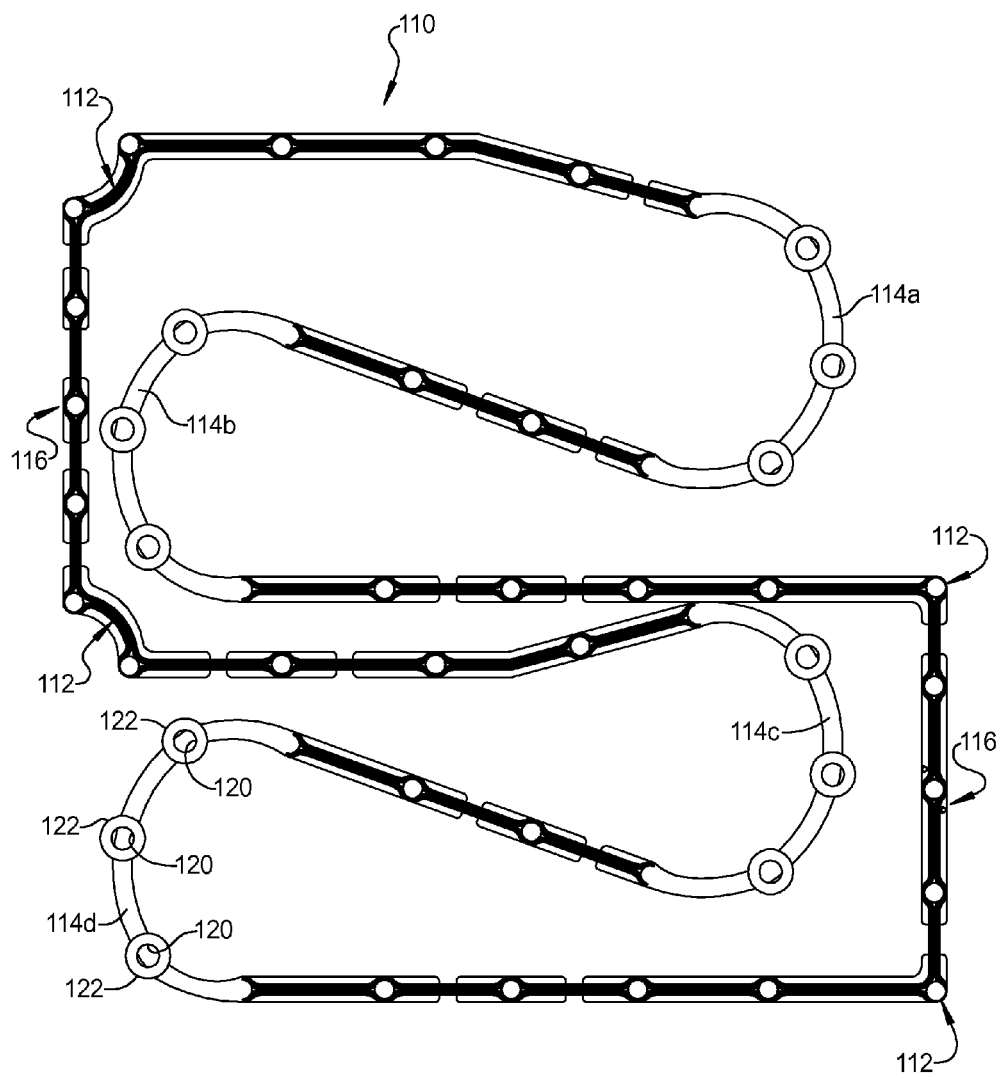
FIG. 8 is a top plan view of a second embodiment of a large gasket formed in a deformed shape according to the principles of the present disclosure.

With reference to FIG. 8, a second embodiment of the gasket 110 having a deformed shape is shown. In the gasket 110, four deformable regions 114A, 114B, 114C, 114D are provided along two of the straight portions of the gasket 110. The deformable sections 114A allow the gasket 110 to be formed in its deformed shape while maintaining the end sections 116 including all four corners 112 in a non-deformed shaped. In the embodiment shown in FIG. 8, the deformable sections 114A are shown with fastener holes 120 extending therethrough at circular bosses 122. In the embodiment shown in FIG. 8, the disclosed configuration allows the large gasket to be formed with a footprint having a length dimension of approximately ⅓ the final shape of the gasket 110. It should be understood to one having ordinary skill in the art that the use of these deformable sections 14, 114 as disclosed in the above-embodiments, can be selectively used to provide greatly reduced footprint sizes for molding a large gasket in a deformed shape.

The design of the present disclosure allows a very large gasket with short aspect ratios (wider than taller cross-sections), to be molded or produced in a deformed shaped while still allowing the gasket to sit flat in an assembly without deformation on the mating surface. The gasket has intermittent cross-sections including standard wide gasket sections followed by narrow sections designed to deform that continue to provide a sealing function but also allow some relief in the molded shape to conform to the mating component. Wide gaskets without the alternating reduced cross-sectional width design would have a tendency to distort out of plane causing difficulties in assembly and function. The ability to mold the gaskets out of shape allows smaller injection machines to be utilized reducing the tooling, operational costs and capital investment required to mold the large gaskets.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A gasket comprising:
   a plurality of corner sections each having a cross-section having a width of at least a first dimension, each corner section comprising a fastener hole; and
   a plurality of deformable sections disposed between said plurality of corner sections, each of said plurality of deformable sections having a cross-section having a width less than said first dimension and having a curved shape in a plan view that is deformable to a straight shape in its installed condition, wherein said deformable sections allow said gasket to be formed with a smaller molding footprint than the assembled gasket shape and said plurality of corner sections have a same angled orientation in its installed and un-installed positions.

2. The gasket according to claim 1, wherein said cross-section of said plurality of deformable sections and said cross-section of said plurality of corner sections have a generally equal height dimension.

3. The gasket according to claim 1, wherein said cross section of said plurality of deformable sections and said cross-section of said plurality of corner sections each include at least one raised bead portion on top and bottom surfaces thereof.

4. The gasket according to claim 1, further comprising a plurality of straight sections disposed between pairs of said plurality of deformable sections.

5. The gasket according to claim 4, wherein said plurality of straight sections each have a cross section having a width of at least said first dimension.

6. The gasket according to claim 5, further comprising a plurality of fastener holes in said corner sections and said straight sections.

7. The gasket according to claim 1, wherein said cross-section of said plurality of corner sections has a greater width dimension than a height dimension.

8. The gasket according to claim 1, wherein a plurality of said deformable sections are disposed between an adjacent pair of corner sections.

9. The gasket according to claim 1, further comprising at least one indexing post extending from said gasket.

10. The gasket according to claim 1, wherein at least one of said plurality of corner sections includes a U-shaped cross-section.

11. The gasket according to claim 10, wherein said U-shaped cross-section includes at least one undercut portion in at least one of a pair of sidewalls of said U-shaped cross-section.

12. The gasket according to claim 4, wherein at least one of said plurality of straight sections includes a U-shaped cross-section.

13. The gasket according to claim 12, wherein said U-shaped cross-section includes at least one undercut portion in at least one of a pair of sidewalls of said U-shaped cross-section.

* * * * *